United States Patent
Geus

(10) Patent No.: US 6,426,376 B1
(45) Date of Patent: Jul. 30, 2002

(54) GRAPHITIC MATERIAL LOADED WITH ALKALI METAL

(75) Inventor: John Wilhem Geus, Bilthoven (NL)

(73) Assignees: Universiteit Utrecht; U-Cat B.V., both of (NL)

(*) Notice: Subject to any disclaimer, the term of this patent is extended or adjusted under 35 U.S.C. 154(b) by 0 days.

(21) Appl. No.: 09/529,518

(22) PCT Filed: Oct. 15, 1998

(86) PCT No.: PCT/NL98/00592
§ 371 (c)(1),
(2), (4) Date: Jun. 27, 2000

(87) PCT Pub. No.: WO99/20563
PCT Pub. Date: Apr. 29, 1999

(30) Foreign Application Priority Data

Oct. 16, 1997 (NL) .............................................. 1007295

(51) Int. Cl.$^7$ .............................................. C01B 31/04
(52) U.S. Cl. .................... 523/215; 423/448; 524/495
(58) Field of Search .................. 523/215; 423/448; 524/495

(56) References Cited

U.S. PATENT DOCUMENTS

| | | | | |
|---|---|---|---|---|
| 3,252,889 A | | 5/1966 | Capell et al. ................ | 208/120 |
| 4,887,273 A | * | 12/1989 | Komatsubara ................ | 372/41 |
| 5,436,093 A | * | 7/1995 | Huang ......................... | 429/217 |
| 5,503,819 A | | 4/1996 | Holmgren ................. | 423/328.1 |
| 5,795,678 A | * | 8/1998 | Takami ........................ | 429/218 |
| 5,951,959 A | * | 9/1999 | Nishimura ................ | 423/447.1 |
| 6,103,416 A | * | 8/2000 | Bauerlein ................... | 429/127 |

FOREIGN PATENT DOCUMENTS

WO    WO 92/13636    8/1992

* cited by examiner

Primary Examiner—Paul R. Michl
(74) Attorney, Agent, or Firm—Weingarten, Schurgin, Gagnebin & Lebovici LLP

(57) ABSTRACT

A graphitic material having an accessible surface of at least 50 m$^2$ per gram, wherein 0.1–40% by weight, based on the weight of the material, of at least one alkali metal is taken up between the graphite layers.

24 Claims, No Drawings

GRAPHITIC MATERIAL LOADED WITH ALKALI METAL

The invention relates to a material in which alkali metal atoms are taken up between graphitic layers of carbon atoms, on a material that can be prepared from such a graphitic material loaded with alkali metal, e.g. by allowing the graphitic material to react either with compounds with reactive hydroxyl ions or with water or with reducible metal ions. The invention further relates to the use of these graphitic materials as water remover, as basic catalyst, as alkali metal reagent, and as filler for polymers.

It is technically very difficult to prepare and stabilize finely divided alkali metals.

A conventional technique to produce finely divided metals is to start from oxides or other reducible compounds of the desired metals that can be properly brought into a finely divided form. In general, oxides or other ionic compounds are much simpler to bring into a finely divided form than metals. This largely applies to alkali metals which have a low melting point and are readily deformable. Subsequently, the finely divided oxides or other ionic compounds are reduced to the corresponding metals.

In the case of relatively base metals, such as nickel or cobalt, this reduction is preferably carried out by heating the material in a stream of a gaseous reducing agent. The reduction is carried out at a lowest possible temperature to inhibit sintering of the resulting metal particles as much as possible. When using not too high a reduction temperature and/or a short time in which the reduction is carried out, it is possible to obtain powders of metal particles in which the conglomerates of the elementary particles have a low mechanical strength and can be readily processed into smaller particles.

More noble metals, such as platinum, palladium or silver, can already be reduced at much lower temperatures. For this reason small particles of such metals are often prepared by carrying out the reduction in liquid phase. As reducing agent a soluble organic compound is mostly used, e.g. formalin, although the reduction can also be carried out by passing hydrogen through a(n) (aqueous) solution of a suitable soluble compound of the metal ion to be reduced.

The processes described in both preceding paragraphs cannot be used for the very base alkali metals.

When finely divided metals must be used at higher temperatures or must be reduced at higher temperatures, a so-called carrier is mostly used. A carrier is a finely divided material that does not sinter at (highly) elevated temperatures. Known carriers are alumina and silica. The metal compound to be reduced is applied in finely divided form to the surface of this carrier, after which the reduction is carried out at elevated temperature in a stream of gaseous reducing agent. Mostly, the sintering of the metal particles formed can be largely suppressed in this way. An additional advantage is that the carrier can be used as porous bodies having dimensions of, e.g., 0.5 cm. In a technically simple manner, a gas stream can be passed through a packed bed of such carrier bodies loaded with the compound to be reduced.

The reduction with a gaseous reducing agent is not possible with alkali metals applied to a carrier. Not only does the position of the thermodynamic equilibrium not allow reduction, but most of the commercial carrier materials react rapidly with alkali metal ions.

Yet there is a great need for alkali metals in finely divided form. In many reactions, and in particular in many organic chemical reactions, alkali metals are used, of which the relatively small alkali metal surface is a drawback. Also, alkali metals are frequently used as siccative for organic liquids; however, the use of, e.g., sodium filament is technically difficult, certainly on a larger scale. One of the objects of the invention is to provide alkali metals having a large accessible surface.

For thermal dehydrogenation reactions it is attractive to have a material that can react to form stable metal hydrides. It is thus possible to drastically reduce the hydrogen partial pressure, so that at a lower temperature the equilibrium moves in the desired direction. Disintegration of the compound to be dehydrogenated can thus be inhibited. An example is the dehydrogenation of ethyl benzene to styrene, which reaction is now carried out at highly elevated temperature. It is known that alkali metals form hydrides that are still stable at rather high temperatures; these hydrides disintegrate at even higher temperatures. Consequently, such metal hydrides offer the possibility to carry out dehydrogenations at relatively low temperatures.

Another important use of alkali metals in finely divided form is the preparation of finely divided other metals. The alkali metal is then used as reducing agent, as is conventional in the preparation of base metals, such as titanium, in which the reduction is generally carried out with magnesium metal. With specific base metals it is very difficult to carry out the reduction with a gaseous reducing agent. A relatively unexpected example is metallic iron. When the iron is applied to a suitable carrier material, it is difficult to rapidly reduce the water vapor pressure within the porous material to such an extent that reduction to the metallic iron is thermodynamically possible. Consequently, only reduction to divalent iron initially occurs. Divalent iron rapidly dissolves in silica, while it rapidly reacts with alumina to form a spinel; in both cases the iron cannot be reduced any more. Metals that are less noble than iron, such as titanium, cannot be reduced with a gaseous reducing agent at all. With finely divided alkali metals such base metals can also be reduced. Thus, for instance, it is possible to prepare an iron-titanium alloy in finely divided form. Such an alloy is of great interest to the storage of hydrogen. With the finely divided alloy disintegration does not occur, which causes great problems with such an alloy in not finely divided form upon desorption of hydrogen.

There is technically also a great need for finely divided solids of alkaline reaction. First of all, this applies to fillers of polymers. Both in polymers prepared with Ziegler-Natta catalysts and in polyvinyl chloride hydrogen chloride is released. This released hydrogen chloride adversely affects the color and the mechanical properties of the polymer. When processing the polymer, released hydrogen chloride additionally causes damage to the processing apparatus and is therefore highly undesirable. It is of great interest to have finely divided solids of alkaline reaction that can be processed in such polymers, and which can thus react with released hydrogen chloride. According to the prior art hydrotalcites are used for that purpose, which, however, are not very finely divided. occasionally, organometallic compounds of heavy metals, such as lead, are also used, which gives rise to environmental pollution. Of great significance to this use is that the polymer in which the solid compound of alkaline reaction must be processed properly moistens this solid. This is not the case with the hydrophilic hydrotalcites, so that this material must be covered with specific compounds.

A further use of finely divided solids of alkaline reaction is the use as catalyst in basically catalyzed reactions. At the moment a lot of soda and lye is consumed for such reactions, in which the catalyst cannot be recovered. A solid catalyst of alkaline reaction would therefore be very valuable.

A further object of the invention is therefore to provide finely divided alkaline solids.

According to the invention it has now been found that alkali metals can essentially be finely distributed between atom layers of carbon having a graphite structure. Preferably, the atomic graphite layers are not arranged in the direction perpendicular these layers. In properly crystallized graphite the carbon atoms are present every other layer in the same positions. Irrespective of the arrangement of the carbon atoms in successive atomic graphite layers relative to each other, the material takes up alkali metal atoms. When the atomic graphite layers are less properly arranged in the direction perpendicular to the graphite layers, reference is made to turbostratic graphite. To obtain a sufficiently large surface of the alkali metal, the lateral dimension of the atomic graphite layers must of course not be too large. This is also necessary to effect an efficient filling of the material with the alkali metal. With relatively large graphite layers the alkali metal ions penetrate only at the edges of the graphite sheets, so that a relatively low filling results. A good measure of the lateral dimensions of the graphite layers proved to be the surface of the material. It has been found that a surface of at least 20 $m^2$ per gram of carbon and preferably of more than 50 $m^2$ per gram is required to obtain a good filling of the material with the alkali metal. Surprisingly, it is already sufficient to bring the graphitic material into contact with molten alkali metal, and in particular molten potassium, to have it rapidly taken up by the material. Also with cesium the alkali metal is taken up very smoothly. Of course, the graphitic material may also be brought into contact with gaseous alkali metals. In that case the alkali metal can be taken up at higher temperatures.

Surprisingly, it has been found that a material that has taken up some potassium rapidly takes up liquid sodium upon contact with this metal. Without limiting the scope of the invention, it is assumed that this is caused by the fact that the properly polarizable potassium is rapidly taken up and the distance of the graphite layers is thus increased, which renders it possible to take up the less properly polarizable sodium.

A special material is obtained by allowing carbon filaments to grow from small metal particles. Such filaments are described in a number of publications (see, e.g., EP-A-0619388, EP-A-0641400, EP-A-078920, WO-A-9105089, and WO-A-9007023). Such carbon filaments show two different main structures of the graphite layers. There are carbon filaments in which the graphite layers are oriented parallel to the axis of the filament, while it is also possible to grow filaments in which the graphite layers occur at an angle to the axis of the filament. By controlling the conditions during the growth of the carbon filaments, the construction of the conglomerates of the filaments can be excellently controlled. Thus, when starting from large and small metal particles from which the filaments are grown, thin straight filaments having a large pore volume and a large surface per gram may first be grown from the small metal particles, and then highly twisted thick filaments are grown from the large metal particles. The surface thereof per gram is smaller, but the presence of the thick twisted filaments leads to a high mechanical strength of the resulting conglomerates of carbon filaments. By controlling the conditions of growth, it is possible to grow mechanically strong bodies having a diameter of about 3 mm. Such bodies are excellently suitable for carrying out liquid phase reactions, in which the material is suspended in a liquid. For other reactions preference may be given to larger bodies constructed from highly coherent carbon filaments. Such mechanically very strong bodies having dimensions up to a few millimeters can be grown. It is also possible to fill specific vessels completely with carbon filaments. In this connection it must be considered that the mechanical strength of the carbon filaments is great, so that fracture of even thick-walled metal vessels can occur.

The metal particles from which the carbon filaments are grown may be encapsulated at the end of the growing process with a layer of graphitic carbon. Thus, the metal has become fully inert. In most cases it is attractive to apply the metal particles from which the carbon filaments are grown to a carrier. It has been found that during the growth of the carbon filaments the metal particles are released from the carrier. After the growing process the carrier can be smoothly removed, if desired, by dissolving in acid (alumina) or lye (silica).

Surprisingly, it has now been found that such conglomerates of carbon filaments can excellently take up alkali metals. Very large amounts of alkali metals can be taken up in the filaments. Thus, conglomerates with 25–30% by weight of potassium can be readily prepared. The accessible surface of the carbon filaments may be varied from about 50 to about 300 $m^2$ per gram. According to a preferred form of the material according to the invention the alkali metal is therefore arranged in such conglomerates of carbon filaments.

It has been found that, surprisingly, the reactivity of alkali metals taken up in such conglomerates of carbon filaments is very high. Thus, accordingly loaded carbon filaments can be allowed to react very rapidly with organic molecules with reactive hydroxyl groups, such as alcohols, while the stoichiometrically calculated amount of hydrogen is released. A rapid reaction is also obtained with water. The large surface of the carbon filaments at which the alkali metal atoms become rapidly available is of great interest when carrying out organic chemical reactions, in which alkali metal atoms participate in the reaction. An example is the Wurtz-Fittig reaction. Carbon filaments loaded with alkali metals are also excellently suitable as siccative for organic liquids, in particular for technical use. It is sufficient here to use much less alkali metal than with alkali metal filaments according to the prior art. Moreover, a smooth separation of the treated liquid can be obtained by controlling the dimensions of the conglomerates of carbon filaments.

The great activity of the alkali metal atoms taken up in the graphic materials according to the invention and in particular of alkali metal atoms taken up in conglomerates of carbon filaments also appears from the reaction with reducible metal ions. Thus, a very fine distribution of noble metals, such as platinum, palladium or rhodium, on the carbon filaments can be obtained by bringing a compound of the metal to be applied, in which it occurs in oxidized form, into contact with conglomerates of carbon filaments loaded with alkali metal. The resulting material is excellently suitable for catalytic reactions. From the prior art it is known which compounds must be used for that purpose. Thus, the potassium-containing conglomerates of carbon filaments will be dispersed in a non-reactive, generally non-polar liquid, and an organometallic compound of the desired catalytically active metal soluble in this liquid will be used. The amount of alkali metal with which the conglomerates of carbon filaments are loaded may be adapted to the amount of metal to be deposited on the filaments. Thus, a uniform distribution of the active metal over the carbon filaments is always obtained, which is of great advantage in catalytic uses. If a carrier of alkaline reaction is desired, e.g. to suppress acid-catalyzed reactions, the carbon filaments can be loaded with excess alkali metal in that case the addition of the solution with the metal to be reduced must be properly controlled in a controlled manner in the suspension of the conglomerates of carbon filaments. Such dosing procedures are known from the prior art.

Especially for applying metals which are to be reduced only at higher temperatures the process in which materials loaded with alkali metals according to the invention are used is of great significance. Thus, iron catalysts promoted with potassium are used for the ammonia synthesis according to the prior art. The technical catalysts contain a few percents of alumina to prevent sintering of the iron. Although preference would be given to the use of a hydrophobic carbon carrier for the ammonia synthesis, this is not very possible. The reduction of the iron occurs only at a relatively high temperature, at which hydrogenation of the carbon carrier to methane also occurs. A new catalyst for the ammonia synthesis has been recently introduced, in which ruthenium promoted with potassium is applied to an active carbon carrier. However, a much better catalyst can be obtained from the materials according to the invention, in which the potassium promoter is present, and in which either ruthenium or iron can be used as active component.

For the Fischer-Tropsch synthesis catalysts containing iron or cobalt are used according to the prior art. Such catalysts can also excellently be prepared from the materials according to the present invention. When carrying out a process with a suspended catalyst, the high mechanical strength of the carbon filaments may be of great benefit.

In the above treatment with compounds with active hydroxyl groups or with non-reactive liquids containing little water, the reaction product of alkaline reaction, the alkali alcoholate or the alkali hydroxide, surprisingly, remains connected to the graphitic material. A solid material of alkaline reaction is thus obtained, for which there are a number of important uses. Also when used as a solid material of alkaline reaction, the use of carbon filaments has great advantages. According to a preferred embodiment of the material according to the invention the solid material of alkaline reaction is therefore produced from conglomerates of carbon filaments.

An important use is the use as filler for polymers. The way the carbon filaments grow from gas molecules containing carbon atoms the filaments are hydrophobic, so that a good interaction with the polymer is ensured. Moreover, the carbon filaments are characterized by a high electric conductance. An electric conductance sufficiently high for many cases is already obtained at a relatively low load of the polymer with carbon filaments, e.g. 0.1–0.7% by weight. With the materials according to the invention this has been combined with the basically reacting material, which can react with the released hydrogen chloride. According to a preferred embodiment of the material according to the invention the reaction of the alkali metal with polyols is carried out with a suitable hydrocarbon chain. Such polyols are now already used with good results for the stabilization of polymers.

After reaction of the alkali metal with compounds with active hydroxyl groups or with liquids in which water is present in highly diluted form, materials are obtained which can be excellently used as solid basic catalysts. Surprisingly, it has been found that after loading with alkali metal and reaction with an alcohol or with water the conglomerates of carbon filaments show excellent activities for the transesterification reaction. With such catalysts the conversion of glycerol esters of stearic acid and of linoleic acid into mixed esters can be carried out with excellent results. It has been found that the catalysts retain their activity when repeatedly used, which indicates that leaching of the alkali metal hydroxide does not occur appreciably.

What is claimed is:

1. A graphitic material having an accessible surface of at least 50 $m^2$ per gram, wherein 0.1–40% by weight, based on the weight of the material, of at least one alkali metal is taken up between the graphite layers.

2. A graphitic material according to claim 1, having a content of turbostratic graphite of more than 80% by weight of the amount of carbon totally present.

3. A graphitic material according to claim 1, consisting of carbon filaments grown from metal particles having a diameter of 5 nm to 5.5 mm.

4. A graphitic material according to claim 1, consisting of carbon filaments, wherein the graphite layers are oriented in parallel to the axis of the filament.

5. A graphitic material according to claim 1, consisting of carbon filaments, wherein the graphite layers are oriented at an angle to the axis of the filament.

6. A graphitic material according to claim 1, wherein the alkali metal is potassium.

7. A graphitic material according claim 1, wherein the alkali metal consists of potassium and sodium.

8. A process for preparing a graphitic material according to claim 1, comprising contacting a graphitic material with an accessible surface of at least 50 $m^2$ per gram with a liquid or gaseous alkali metal.

9. A process according to claim 8, wherein the graphitic material is brought into contact with liquid or gaseous potassium.

10. A process according to claim 8, wherein the graphitic material is first brought into contact with potassium and then with liquid sodium.

11. A graphitic material according to claim 1, wherein the alkali metal atoms present between the graphite layers have completely or partly reacted with a suitable optionally polyhydric alcohol.

12. A graphitic material according to claim 1, wherein the alkali metal atoms present between the graphite layers have been allowed to completely or partly react with a suitable reducible metal ion, thereby, covering the material with very finely divided metal particles originating from a reducible metal ion.

13. A polymer comprising the graphitic material according to claim 6 as filler.

14. A polymer according to claim 13, wherein the alkali metal ions present in the graphitic material have previously reacted with a polyol.

15. A graphitic material prepared according to claim 8, wherein the alkali metal atoms present between the graphite layers have completely or partly reacted with a suitable optionally polyhydric alcohol.

16. A graphitic material prepared according to claim 8, wherein the alkali metal atoms present between the graphite layers have been allowed to completely or partly react with a suitable reducible metal ion, thereby covering the material with very finely divided metal particles originating from a reducible metal ion.

17. A process for using the graphitic materials of claim 1 for removing water from organic liquids, said process comprising contacting said graphitic material with said organic liquid.

18. A process for using the graphitic materials of claim 1 as an alkali metal reagent in reactions wherein alkali metals are involved, in which process said graphitic materials provide said alkali metals.

19. A process for using the graphitic materials of claim 1 as a catalyst in a basically catalyzed organic chemical reaction comprising contacting said graphitic material with an accessible surface of at least 50 m$^2$ per gram with a liquid or gaseous alkali metal.

20. The process of claim 19 wherein said alkali metal is potassium.

21. The process of claim 20 wherein said chemical reaction is a transesterification.

22. A process for using graphitic materials for removing water from organic liquids, said graphitic materials having been prepared by contacting a graphitic material with an accessible surface of at least 50 m$^2$ per gram with a liquid or gaseous alkali metal, said process comprising contacting said graphitic material with said organic liquid.

23. A process for using graphitic materials as an alkali metal reagent in reactions wherein alkali metals are involved, said graphitic materials having been prepared by contacting a graphitic material with an accessible surface of at least 50 m$^2$ per gram with a liquid or gaseous alkali metal, in which process said graphitic materials provide said alkali metals.

24. A process for using graphitic materials as a catalyst in a basically catalyzed organic chemical reaction, said graphitic materials prepared by contacting a graphitic material with an accessible surface of at least 50 m$^2$ per gram with a liquid or gaseous alkali metal, said process comprising contacting said graphitic material with liquid or gaseous reagents in said chemical reaction.

* * * * *

UNITED STATES PATENT AND TRADEMARK OFFICE
CERTIFICATE OF CORRECTION

PATENT NO. : 6,426,376 B1
DATED : July 30, 2002
INVENTOR(S) : John Wilhem Geus

It is certified that error appears in the above-identified patent and that said Letters Patent is hereby corrected as shown below:

Column 3,
Line 7, "these layers." should read -- to these layers. --.

Signed and Sealed this

Second Day of March, 2004

JON W. DUDAS
*Acting Director of the United States Patent and Trademark Office*